Inventor,
Paul Danielsson
by Sommers & Young,
Attorneys

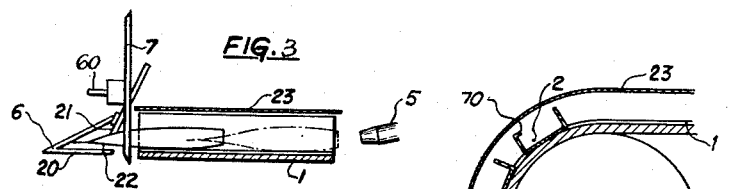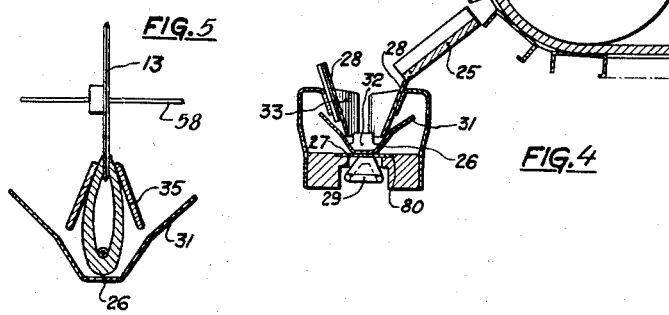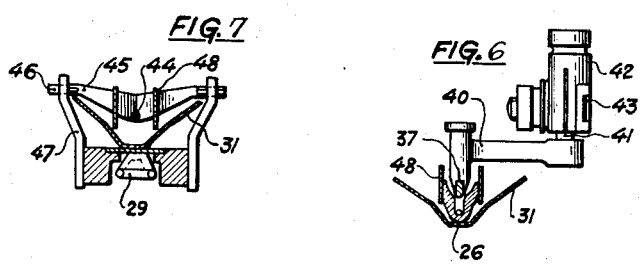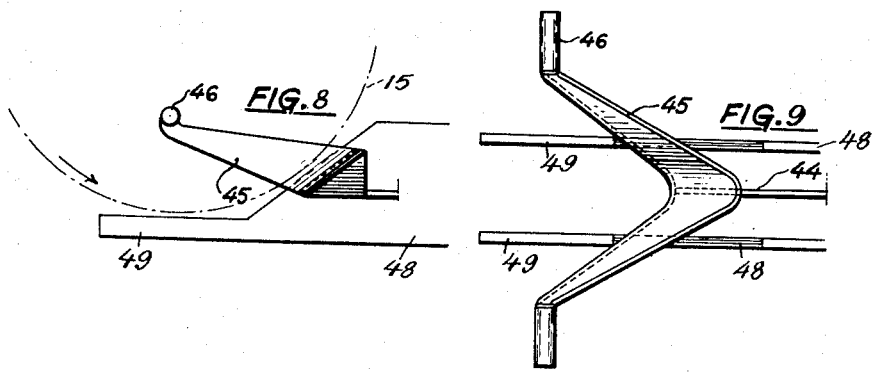

Patented June 10, 1941

2,245,329

UNITED STATES PATENT OFFICE 2,245,329

METHOD OF EVISCERATING AND CLEANING FISH

Paul Danielsson, Stockholm, Sweden, assignor to Aktiebolaget Gerh. Arehns Mekaniska Verktad, Stockholm, Sweden, a joint-stock company of Sweden Application November 14, 1938, Serial No. 240,361 In Sweden July 28, 1937

4 Claims. (Cl. 17—3)

This invention relates to a method of eviscerating and cleaning fish, and more particularly to that known method in which the belly of the fish is slit and spread open so that the cavity of the fish will be readily accessible for cleaning. It is known to remove the entrails of the fish thus slit and spread open by brushing. In this known method, however, the cavity of the fish has to be brushed forcibly in order to clean same thoroughly, thereby injuring the fish. Soft meaty parts thereof will be torn asunder, particularly when dressing delicate fish such as small herrings. Moreover, even a forcible brushing does not fully ensure a complete removal of the entrails which have to be torn off at the anal-opening of the fish. The brush cannot always effect this, particularly if the fish vary in size, which is oftentimes the case in the same draught. This disadvantage is increased if the slitting cutter happens to cut off the entrails at some distance from the anal-opening. Then it is almost impossible to remove the rear part of the entrails. Furthermore, a forcible brushing requires a stiff brush and as at times small fish have to be cleaned completely, the brush has to operate relatively near to the fish-supporting means. Consequently the brush will be very forcibly pressed into the cavity of larger fishes with the result that they will be thereby damaged. It is an object of the invention to remove such drawbacks.

Thus, for the purpose of obviating the aforesaid disadvantages and nevertheless obtaining a more thorough cleaning of the cavity of the fish than has been possible hitherto, the belly of the fish is slit open after the entrails and parts adhering thereto have been removed from, for instance, pulled out of, the cut head end of the fish, whereafter parts of the entrails still remaining within the cavity of the fish are brushed or scraped out of said cavity in a direction conveniently towards the head end of the fish. Thereby the long and stringy parts of the entrails are removed before the cleaning proper, which can be executed in such a gentle and nevertheless effective manner that any blood running along the base of the cavity of the fish will also be removed. By the pulling action above-mentioned the entrails are torn off at the anal-opening of the fish. Therefore, the splitting is conveniently commenced there. The cleaning of the fish will be effected particularly thoroughly if, after removal of its entrails, it is moved in its longitudinal direction head rearwards past a slitting cutter and thereafter in the same direction past a rotating brush. The position of the fish during its dressing is such that its split parts will easily be spread apart, partly under the influence of gravity.

In the accompanying drawings, an apparatus for performing the method according to the invention is shown by way of example.

Fig. 3 is a cross-sectional view, on an enlarged scale, taken on the line III—III of Fig. 1;

Fig. 4 is a side sectional view on an enlarged scale taken on the line IV—IV of Fig. 1;

Fig. 5 is a cross-sectional view on an enlarged scale taken on the line V—V of Fig. 1;

Fig. 6 is an end view, on an enlarged scale, partly in section, taken on the line VI—VI of Fig. 1;

Fig. 7 is a sectional view on an enlarged scale taken on the line VII—VII of Fig. 1;

Figs. 8 and 9 are a side view and a plan view respectively of parts of the fish spreading device shown in Fig. 7.

Figure 1:
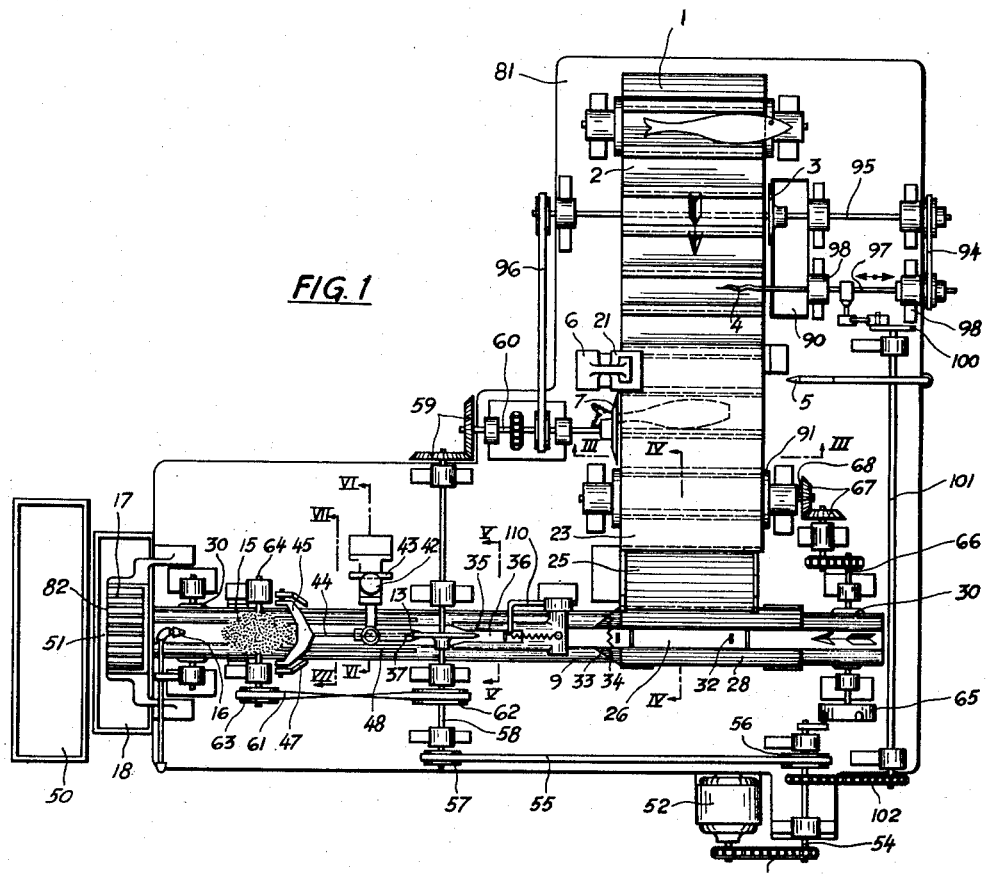
Fig. 1 is a plan view of the apparatus.
Figure 2:
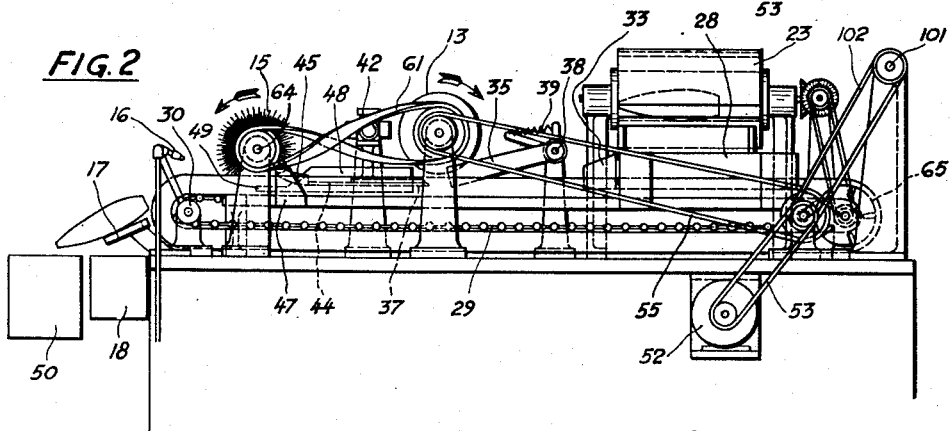
Fig. 2 is an elevation of the apparatus.

As shown in Fig. 1, the fish are positioned in pockets 2 of an endless conveyor 1 with their bellies turned in the direction of movement of the conveyor. On the stepwise movement of the conveyor, the head of the fish is moved towards a revolving cutter 3 and thereby cut off. Thereafter, the fish is moved into a position opposite to a screw or auger device 4 by means of which the entrails and parts adhering thereto are pulled out of the cut off head end of the fish and drop through an opening 90 in the table of the machine frame 81. The fish thus partly eviscerated is moved further and passes a nozzle 5 that projects a jet of water on to the fish so that the latter is displaced longitudinally within its pocket 2 until an abutment or stop 6 determines the longitudinal position of its rear end with respect to the pocket. In this position within the pocket 2, the fish is moved by the conveyor past a cutter 7 which cuts off its tail end. At the delivery end of the conveyor 1 the belt passes over the sprocket 91 so as to tilt the fish so that it drops on an inclined removable plate 25 and then past the chute 28, which is positioned above the endless conveyor 9, and with its back down, into the trough shaped endless conveyor 9 which is directed transversely to the conveyor 1 and is adapted to move the fish longitudinally along a straight path of travel after the fish has passed the chute 28. The conveyor 9 advances the fish rear end forward first through an adjusting device 11 having erecting flaps 33 at the forward end of chute 28 and through a guide 35 against a rotating cutter 13 which slits the belly of the fish open from its anal-opening to its cut head end. On continued advancing of the fish, it is moved beneath a device which spreads its sides open and moves said sides down against the sides of the chute of the conveyor 9. The fish thus spread open is moved beneath a revolving brush 15 which cleans the cavity of the fish thoroughly. The fish thus cleaned and the brush are scoured by means of water projected thereonto through a nozzle 16. Thereafter the fish is delivered by the conveyor 9 to a sloping lattice 17 at the front end 82 of which any entrail parts that may be delivered by the conveyor drop into a collecting bin 18 or the like while the fish slides over the lattice into a collecting bin 50.

The rotary screw 4 is introduced into the body of the fish and thereafter retracted so as to pull out its intestine together with other parts of the entrails adhering thereto. This pulling may also be executed by means of the device as described in my copending application No. 111,548, filed November 18, 1936, which has issued as Patent No. 2,169,791, dated August 15, 1939, in which case the movement of the conveyor 1 may be continuous.

The abutment or stop 6 as shown in Fig. 3 may consist of a bottom plate 20 and an upper inclined plate 21. The fish, by the jet of water ejected through the nozzle 5, is displaced against the plate 21 and its rear end is partly moved through the interspace 22 until said movement is arrested. Then the fish occupies such a position that, independently of the length of its caudal fin, the latter will be cut off at a predetermined thickness of the rear end of the fish when the latter is moved past the cutter 7.

The tilting and transferring device shown in Fig. 4 has a curved plate 23 which covers the forward end of the conveyor 1 and extends above the pocket 2 that is positioned opposite the nozzle 5. As each of the pockets 2 has a rearwardly bent flange 70 the fish will rest on its belly within the pocket until its back has passed the bottom edge 24 of the plate 23. Then the fish is tilted so that its back will be turned downwards and the fish will drop onto the plate 25, which is removably attached to the frame of the machine, and drop therefrom into a chute 28 formed by two obliquely positioned plates and opening downwardly into pockets 26 of the conveyor 9. The pockets 26 are attached to plates 27 which in turn are attached to a chain 29 which runs over sprocket wheels 30. The plates 27 slide in guides 80. The pockets 26 have outwardly bent walls 31 and drivers 32 which are positioned at such a distance from one another that even the largest fish intended to be handled may be positioned between two consecutive drivers. The fish, irrespective of its length, will drop into a pocket in such a position that its rear end will occupy a position immediately behind a driver 32.

On the forward ends of the chute 28 are pivotally mounted guide flaps forming the erector 33 which flaps are pulled towards one another by means of a spring 34 and adjust the fish so that its belly will be erected and directed vertically upwards when the fish is advanced between them. The fish is first retained by said erector flaps until a driver 32 engages the head end of the fish and urges the fish forwards in the chute 28.

In sequence to the flaps 33 is arranged the above-mentioned guide 35, which has a slot which opens upwardly at the forward portion thereof and constitutes the aforesaid guide 12.

The slitting cutter 13 projects downwards into the slot 36. The guide 35 is pivotally mounted on a pin 38 and is urged downwards by a spring 39 attached to an arm 110, secured to the machine frame.

The device for spreading the fish open is mounted in sequence to the cutter 13 and comprises a beam 37 having a bevelled end which is positioned adjacent to the edge of the cutter 13 and is adapted to penetrate the cavity of the fish as the latter is advanced and split open. The beam 37 is secured to an arm 40 on a bolt 41 which is vertically adjustable in a holder 42. The holder 42 is mounted on a guide 43 and is adjustable in the longitudinal direction of the conveyor. Into the beam 37 is introduced a yielding metal wire 44 which supports two wings 45 each of which has a pin 46 pivotally mounted in a bracket 47. The wings 45 are inclined and shaped so that an interspace corresponding to the opened sides of the fish is formed between the wings and the side walls 31 of the conveyor pockets. Thus, as the fish is spread open by the wings 45 the sides of the fish are simultaneously moved down against the side walls of the conveyor pocket.

Since the brush 15 is positioned adjacent the wings 45, the fish is moved beneath the brush when it is spread open by said wings. Before the sides of the fish are spread apart by the wings 45 they are retained in an upright position by two guide plates 48 which taper and merge into flaps 49 (Fig. 8) at the wings 45 so that they project beneath the brush. The brush 15 is driven in such a direction that it acts against the direction of movement of the conveyor. It commences its brushing action at the anal-opening of the fish and continues said action towards the head end of the fish.

After the fish has passed the jet of water projected by the nozzle 16, it is delivered by the conveyor pocket to the inclined lattice 17 upon which it slides and drops into a collecting receptacle 50. In spite of the action of the jet of water it might happen that some parts of the entrails will be delivered by the conveyor 9 to the lattice 17. Such parts will drop through the lattice or through an interspace 51 between the bottom end of the lattice and the front edge of the bin 18. The fish will, however, slide over said interspace.

For driving the apparatus there is provided a motor 52 which by means of a chain 53 drives a shaft 54 the rotary movement of which is transmitted by a belt 55 and two pulleys 56 and 57 to a shaft 58 carrying the cutter 13. By means of bevel gears 59 the rotary movement of the shaft 58 is transmitted to a shaft 60 that carries the cutter 7. The shaft 58 drives by means of a crossed belt 61 and two belt pulleys 62 and 63 a shaft 64 that carries the brush 15. The brush 15 and the cutter 13 rotate in opposite directions. The rotary movement of the shaft 54 is by means of a Geneva-wheel 65 transmitted to a shaft 66 which by means of bevel gears 67 drives the shaft 68 that carries the sprocket wheel 91 of the conveyor 1. The conveyor 9 is driven by the sprocket wheel 30, secured to the shaft 66. The screw 4 is rotated continuously by a belt 94, shaft 95 and belt 96, which is driven by the shaft 60. The spindle 97 of the screw 4 is slidably mounted in bearings 98 and reciprocated by an eccentric 100 on a shaft 101, driven by a chain 102 from shaft 54.

I claim:
1. The method of eviscerating and cleaning fish comprising the steps of opening the head end of the fish and pulling the entrails and parts adhering thereto out of said head end so that the entrails are pulled loose at the anal opening, then slitting the belly of the eviscerated fish and spreading its sides open, and thereafter lightly brushing the opened cavity of the fish to clean same without injury to the flesh.

2. The method of eviscerating and cleaning fish comprising the steps of opening the head end of the fish and pulling the entrails and parts adhering thereto out of said head end so that the entrails are pulled loose at the anal opening, then slitting the belly of the eviscerated fish commencing the slit at the anal-opening of the fish and spreading the sides of the fish open, and thereafter lightly brushing the opened cavity of the fish to clean same without injury to the flesh.

3. The method of eviscerating and cleaning fish comprising the steps of opening the head end of the fish and pulling the entrails and parts adhering thereto out of said head end so that the entrails are pulled loose at the anal opening, then moving the eviscerated fish longitudinally and while so moving slitting the belly of the fish and spreading its sides open, and thereafter lightly brushing the spread cavity of the fish to clean the opened cavity while moving the fish longitudinally without injury to the flesh.

4. The method of eviscerating and cleaning fish comprising the steps of opening the head end of the fish and pulling the entrails and parts adhering thereto out of said head end so that the entrails are pulled loose at the anal opening, then moving the eviscerated fish longitudinally head end rearwards, slitting the belly of the fish and spreading its sides open, and thereafter lightly brushing the spread cavity to clean the opened cavity without injury to the flesh.

PAUL DANIELSSON.

CERTIFICATE OF CORRECTION.

Patent No. 2,245,329. June 10, 1941.

PAUL DANIELSSON.

It is hereby certified that the name of the assignee in the above numbered patent was erroneously described and specified as "Aktiebolaget Gerh. Arehns Mekaniska Verktad" whereas said name should have been described and specified as --Aktiebolaget Gerh. Arehns Mekaniska Verkstad, of Stockholm, Sweden, a joint-stock company of Sweden--; as shown by the record of assignments in this office; page 2, first column, line 75, strike out the words "and constitutes the aforesaid guide 12"; and that the said Letters Patent should be read with this correction therein that the same may conform to the record of the case in the Patent Office.

Signed and sealed this 26th day of August, A. D. 1941.

(Seal)

Henry Van Arsdale,
Acting Commissioner of Patents.